United States Patent [19]

Bommart

[11] Patent Number: 4,641,818

[45] Date of Patent: * Feb. 10, 1987

[54] APPARATUS FOR ADJUSTING TWO BUTT-ENDS OF RAILS TO BE CONNECTED BY WELDING

[75] Inventor: Patrick T. Bommart, Rueil-Malmaison, France

[73] Assignee: C. Delachaux, Gennevilliers, France

[*] Notice: The portion of the term of this patent subsequent to Mar. 23, 1999 has been disclaimed.

[21] Appl. No.: 285,349

[22] Filed: Jul. 20, 1981

[30] Foreign Application Priority Data

Jul. 30, 1980 [FR] France ............................... 80 16805

[51] Int. Cl.⁴ ............................................. B25B 1/20
[52] U.S. Cl. ......................................... 269/43; 269/87; 269/152; 228/49.1; 219/53; 104/15
[58] Field of Search .................. 269/290, 43, 288, 87, 269/238, 156, 152, 164; 228/49 B, 49 R, 49 A, 49 C, 47, 44.1 R, 44.5; 254/43, 44; 219/53, 54, 55, 158, 161; 104/15

[56] References Cited

U.S. PATENT DOCUMENTS

| | | | |
|---|---|---|---|
| 1,018,183 | 2/1912 | Gray | 254/44 |
| 2,216,434 | 10/1940 | Cooper | 254/43 |
| 3,073,258 | 1/1963 | Miller | 254/43 X |
| 4,103,139 | 7/1978 | Zollinger | 219/161 X |
| 4,176,777 | 12/1979 | Bommart | 254/43 X |
| 4,215,260 | 7/1980 | Zollinger | 219/53 |
| 4,270,036 | 3/1981 | Zollinger | 219/53 |
| 4,313,382 | 2/1982 | Bommart | 269/43 X |
| 4,320,708 | 3/1982 | Bommart | 269/43 X |

FOREIGN PATENT DOCUMENTS 2115661 11/1970 France .

Primary Examiner—Frederick R. Schmidt
Assistant Examiner—Steven P. Schad
Attorney, Agent, or Firm—Parmelee, Miller, Welsh & Kratz

[57] ABSTRACT

Apparatus for adjusting two butt-ends of rails to be connected by welding comprises a rigid structure having two aligned support plates one for each rail. Each support plate comprises a non-adjustable retaining press and an adjustable retaining press. The fixed jaws of one of each of the presses are intended to be placed on the side of the head of one of the rails and the fixed jaws of the other presses are intended to be placed on the corresponding side of the head of the other rail thus forming four spaced supports. The movable jaws of the presses for the one rail are intended to be placed on the opposite side of the head of this rail and the movable jaws of the presses for the other rail are intended to be placed on the opposite side of the head of the other rail.

6 Claims, 4 Drawing Figures

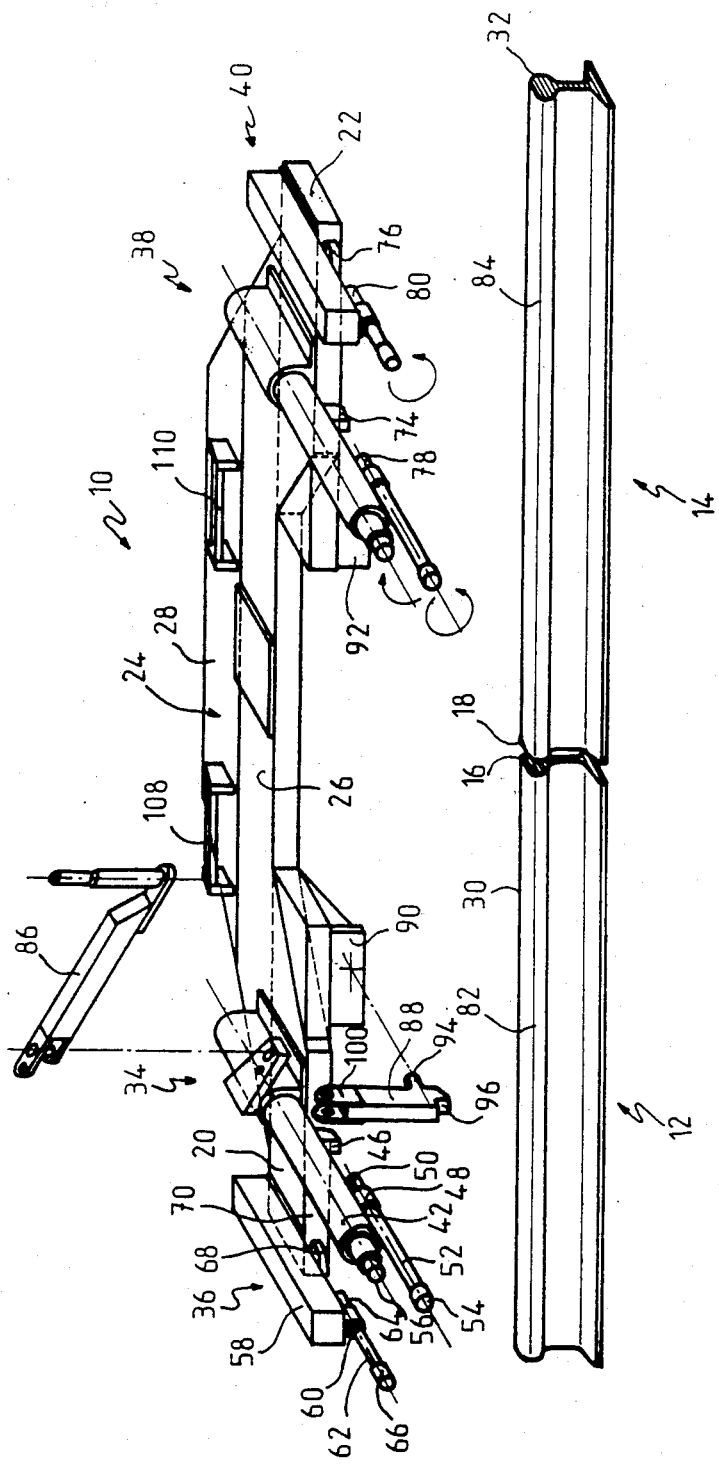
FIG_1

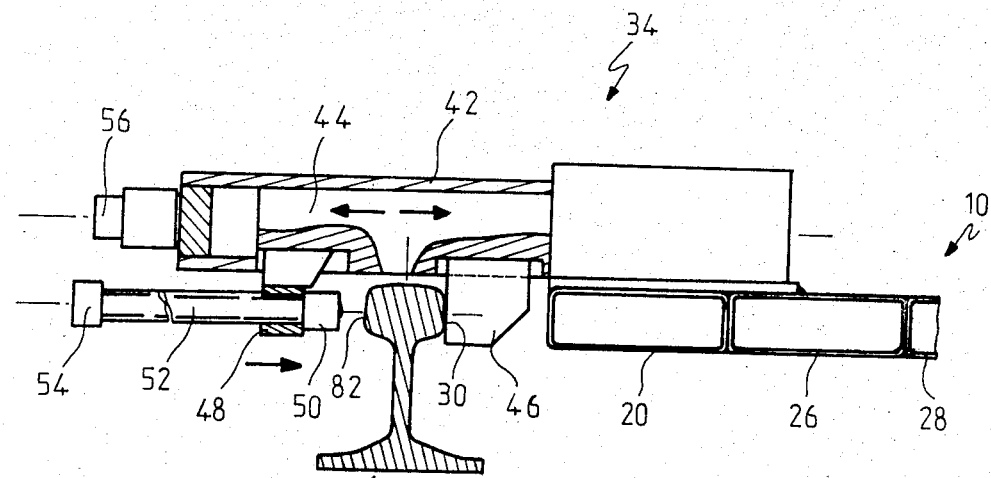
FIG_2
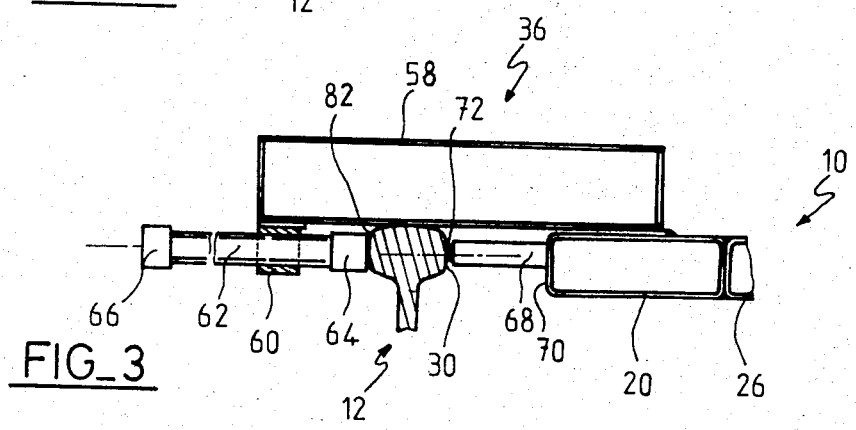
FIG_3
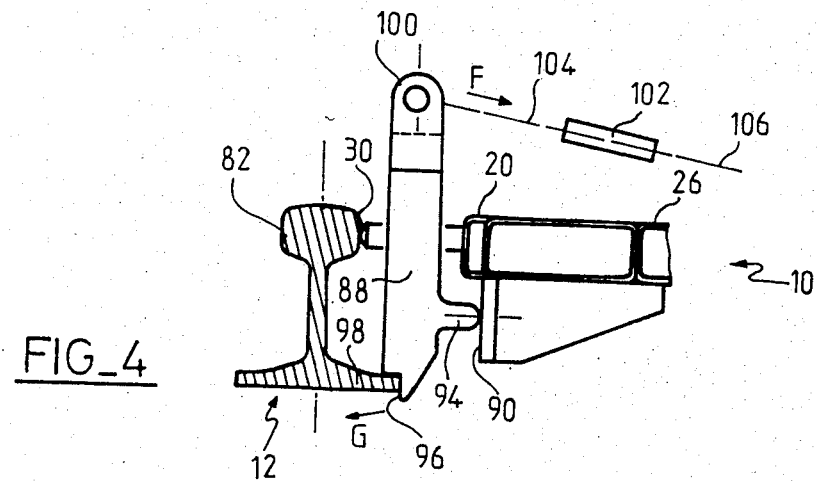
FIG_4

APPARATUS FOR ADJUSTING TWO BUTT-ENDS OF RAILS TO BE CONNECTED BY WELDING

The present invention relates to an apparatus for adjusting two butt-ends of rails to be connected by welding.

An apparatus is known for adjusting two butt-ends of rails to be connected by welding, comprising a rigid concave structure including two support plates which are aligned and connected to each other by a connecting element. This element is capable of being placed horizontally so that the two support plates are laid one on one vertical side of the head of one of the rails and the other on the corresponding vertical side of the head of the other rail, the concave element providing an area of access around the butt-ends. Each support plate is provided with two spaced supportes and with a retaining press provided with a movable jaw able to come to bear on the opposite vertical side of the head of the rail.

The present invention relates to an improvement to the above mentioned device which makes it possible to improve the adjustment of the alignment of two butt-ends of rails to be connected.

According to the present invention there is provided apparatus for adjusting two butt-ends of rails to be connected by welding, comprising a rigid concave structure including two support plates which are aligned and connected to each other, a connecting element which connects the support plates together and which is able to be arranged horizontally so that the two support plates can be placed one on a vertical side of the head of one of the rails and the other on the corresponding vertical side of the head of the other rail, the concave structure defining an area for access around the ends, two spaced supports for each support plate, a retaining press for each support plate provided with a movable jaw capable of bearing on the opposite vertical side of the heads of the rail than the respective plates, and a second retaining press for each support plate whereby the two retaining presses of each support plate are respectively associated with the two supports which respectively constitute the fixed jaws of the two retaining presses.

Preferably, one of the presses of each support plate and the support which is associated therewith can be adjusted by a horizontal movement at right angles to the support plate. Advantageously the two adjustable presses, belonging respectively to the two support plates, are those which are closest to each other.

The apparatus of the present invention may be carried by a movable carriage such as a carriage with two wheels of the hand-truck type or such as a self-propelled carriage of the lorry type or even may be mounted on a stationary installation.

The present invention will now be described by way of example with reference to the accompanying drawings in which:

FIG. 1 is a perspective view of an apparatus according to the invention intended to be placed on two rails whereof the butt-ends are to be welded;

FIG. 2 is a sectional view of one of the adjustable retaining presses of the apparatus of FIG. 1;

FIG. 3 is a sectional view of one of the non-adjustable retaining presses of the apparatus of FIG. 1 and FIG. 4 is a sectional view showing the member for adjusting inclination of the apparatus of FIG. 1.

FIG. 1 shows an adjusting apparatus 10 according to the invention before being positioned on two rails 12 and 14 of which the alignment is to be adjusted before alumino-thermic welding of their respective butt-ends 16 and 18.

The apparatus 10 is constituted by a rigid structure formed by two support plates 20 and 22, which are aligned and connected to each other by a connecting element 24 to form a rigid concave structure. The support plates 20 and 22 are each formed by a box obtained from a member of rectangular section and, likewise, the part 24 is formed from two boxes 26 and 28 obtained from the same sectional member as the support plates 20 and 22. The support plates 20 and 22 are welded to the box 26 and the latter is in turn welded to the box 28, the sections of the boxes 20, 22, 26 and 28 being closed by welded metal sheets. The use of hollow boxes makes it possible to reinforce the rigidity of the structure whilst reducing the weight of the latter.

The rigid structure produced in this way is intended to be arranged horizontally so that the two support plates 20 and 22 are placed respectively on the side 30 of the head of the rail 12 and on the corresponding side 32 of the head of the rail 14.

The support plate 20 is provided with an adjustable retaining press 34 and a non-adjustable retaining press 36. Similarly, the plate 22 is provided with an adjustable retaining press 38 and a non-adjustable retaining press 40.

As shown in FIGS. 1 and 2, the adjustable retaining press 34 comprises a sleeve 42 fixed horizontally to the upper side of the support plate 20 and of the box 26. Mounted to slide in this sleeve 42 is a part 44 supporting at one end a fixed support 46 constituting the stationary jaw of the press 34 and at the other end a tapped part 48 serving to support the movable jaw 50 of the press 34. This movable jaw 50 is fixed to the end of a screw-threaded rod 52 which passes through the part 48 and the other end of which is provided with a control head 54. This head 54 is advantageously constituted by a hexaganol female socket intended to be rotated by a suitable spanner (not shown).

The part 44 which supports the jaws 46 and 50 is able to move horizontally and at right angles to the support plate 20, i.e. transversely with respect to the direction of the rail 12. This movement is controlled by a driving head 56 which may be actuated by the same spanner as mentioned previously, this head being integral with a screw-threaded rod (not shown) cooperating with a screw thread in the part 44.

The retaining press 36 illustrated in FIGS. 1 and 3 comprises a horizontal support 58 welded transversely to the upper side of the support plate 20. This part 58 supports a sleeve 60 which has an integral screw thread in order to receive a threaded rod 62 provided at one end with a movable jaw 64 and at its other end with a driving head 66 which may be actuated by the same spanner as mentioned previously. The press 36 also comprises a stationary jaw 68 constituted by a semi-circular plate welded to the vertical face 70 of the support plate 20. This stationary jaw 68 comprises a support point 72 covered with a stellite tip.

The presses 38 and 40 are similar to the presses 34 and 36. Thus, the press 38 comprises an adjustable stationary jaw 74 and the press 40 comprises a non-adjustable stationary jaw 76. Furthermore, the press 38 comprises a movable jaw 78 and the press 40 comprises a movable jaw 80.

The jaws 46 and 68 are intended to be placed on the side 30 of the head of the rail 12 and the jaws 74 and 76 are intended to be placed on the side 32 of the head of the rail 14 thus forming four supports whereof the alignment may be modified by actuating the adjustable presses 34 and 38. The movable jaws 50 and 64 of the presses 34 and 36 are intended to be placed against the opposite vertical side 82 of the head of the rail 12 and the movable jaws 78 and 80 of the presses 38 and 40 are intended to be placed on the opposite side 84 of the head of the rail 14.

The apparatus illustrated in FIG. 1 also comprises a crucible support 86 which can be swung horizontally and is intended to support a crucible (not shown) intended for the alumino-thermic welding of two butt-ends 16 and 18 once the latter have been suitably adjusted by the apparatus of the invention.

As illustrated in FIGS. 1 and 4, the apparatus of the invention also comprises a member for adjusting inclination comprising a removable lever 88 able to bear against and tilt relative to one or other of the two support plates 20 and 22, in a transverse vertical plane with respect to the direction of the rails 12 and 14. To this end, the support plates 20 and 22 are respectively provided with two vertical plates 90 and 92 to which the lever 88 may be applied. The lever 88 comprises a projection 94 intended to come to bear on one or the other of the two plates 90 and 92. At its lower end the lever 88 comprises a shoulder 96 able to cooperate with the sole of the rail, the inclination of which is to be adjusted. Thus, as shown in FIG. 4, the shoulder 96 of the lever 88 is pressed on the sole (or flange) 98 of the rail 12. The upper end of the lever 88 is provided with a fork-joint 100 intended to receive a tensioning member able to tilt the lever 88 with respect to the rigid structure. This tensioning member comprises a turnbuckle tightener 102 with two oppositely threaded rods 104 and 106, the rod 104 being designed in order to be fixed to the fork-joint 100 and the rod 106 being designed in order to be fixed to an anchorage 108 and 110 integral with the box 24, depending on whether the rail of which the inclination is to be modified, is the rail 12 or the rail 14.

By actuating the turnbuckle tightener 102 in order to move the fork-joint 100 towards the anchorage 108, the latter moves towards the anchorage 108 in the direction illustrated by the arrow F and the shoulder 96 of the lever 88 pivots in the direction of arrow G (FIG. 4).

The apparatus illustrated in FIG. 1 is used in the following manner.

The rails 12 and 14 are released from their fish-plates over a length of 1 or 2 metres.

After having previously adjusted the gap between the butt-ends 16 and 18 to be welded, by a suitable method known per se, the apparatus 10 is put into position on the rails 12 and 14. Provisional clamping of the presses 34, 36, 38 and 40 is then carried out in order to keep the apparatus in position and the presses 34 and 38 are adjusted in order to align the inner vertical sides 30 and 32 of the two rails 12 and 14. The two butt-ends to be welded are then raised slightly using either wedges, or screw jacks or hydraulic jacks, in order to give the rails a pointed arrangement. One then checks by means of a ruler that the alignment of the inner sides of the heads of the rails is correct and by means of another ruler placed on the top of the head of the rail between the presses 34 and 38 that the pointed arrangement of the rails is correct.

If the soles of the two rails are not perfectly aligned, the lever 88 is put in position opposite the rail whereof the sole is to be moved away with respect to the apparatus 10 and the turnbuckle tightener 102 is used to modify the inclination of this rail. Once the two soles are aligned, the presses 34, 36, 38 and 40 are locked and one may thus proceed with the welding operation.

For this, one uses the crucible support 86 for positioning a crucible (not shown) above the butt-ends 16 and 18 and one proceeds with the alumino-thermic welding proper. Once welding is completed, one proceeds, in manner known per se, with the removal of burrs from the weld thus produced.

The apparatus may be supported by a movable carriage such as a two-wheeled carriage of the hand-truck type or by a carriage which can move on rails, of the lorry type, or may be used on a fixed installation.

The apparatus of the invention may be used for laying or repairing of railway tracks.

What is claimed is:

1. Apparatus for adjusting two butt-ends of rails to be connected by welding, comprising a concave rigid structure including two support plates which are aligned and connected to each other and a connecting element which connects the support plates together, the concave rigid structure being able to be arranged horizontally so that the two support plates can be placed one on a vertical side of the head of one of the rails and the other on the corresponding vertical side of the head of the other rails, whereby the concave rigid structure defines an area for access around the ends, the apparatus further comprising two spaced supports for each support plate, a first retaining press for each support plate provided with a movable jaw capable of bearing on the opposite vertical side of the heads of the rail than the respective plates, and a second retaining press for each support plate whereby the two retaining presses of each support plate are respectively associated with the two supports which respectively constitute the fixed jaws of the first and second retaining presses.

2. Apparatus as claimed in claim 1, in which one of the presses of each support plate and the support which is associated therewith can be adjusted by movement at right angles to the support plate.

3. Apparatus as claimed in claim 2, in which the two adjustable presses belonging respectively to the two support plates are those which are closest to each other.

4. Apparatus as claimed in claim 1, which comprises a member for adjusting inclination comprising a removable lever able to bear against and tilt relative to one or the other of the two support plates, this lever defining at one end a shoulder able to rest on the sole of the rail whereof the inclination is to be adjusted and including a tensioning member designed in order to be connected on the one hand to the other end of the lever and on the other hand to an anchoring means integral with the rigid structure.

5. A movable carriage equipped with at least one apparatus as claimed in claim 1. .

6. A fixed installation equipped with at least one apparatus as claimed in claim 1.

* * * * *